United States Patent
Arndt et al.

(10) Patent No.: US 6,189,065 B1
(45) Date of Patent: Feb. 13, 2001

(54) METHOD AND APPARATUS FOR INTERRUPT LOAD BALANCING FOR POWERPC PROCESSORS

(75) Inventors: Richard Louis Arndt; Wen-Tzer Thomas Chen, both of Austin, TX (US)

(73) Assignee: International Business Machines Corporation, Armonk, NY (US)

(*) Notice: Under 35 U.S.C. 154(b), the term of this patent shall be extended for 0 days.

(21) Appl. No.: 09/161,622

(22) Filed: Sep. 28, 1998

(51) Int. Cl.$^7$ ........................................ G06F 13/24
(52) U.S. Cl. ................................ 710/260; 709/105
(58) Field of Search ........................... 710/260–269; 709/102–108

(56) References Cited

U.S. PATENT DOCUMENTS

| | | | |
|---|---|---|---|
| 3,665,404 | * 5/1972 | Werner | 710/262 |
| 4,080,649 | * 3/1978 | Calle et al. | 710/48 |
| 4,831,518 | * 5/1989 | Yu et al. | 714/4 |
| 4,833,598 | * 5/1989 | Imamura et al. | 710/260 |
| 5,179,707 | * 1/1993 | Piepho | 710/260 |
| 5,265,215 | * 11/1993 | Fukuda et al. | 710/123 |
| 5,423,049 | * 6/1995 | Kurihara | 710/262 |
| 5,689,713 | * 11/1997 | Normoyle et al. | 710/263 |
| 5,881,293 | * 3/1999 | Olarig et al. | 710/260 |
| 5,918,057 | * 6/1999 | Chou et al. | 710/260 |

OTHER PUBLICATIONS

IBM Technical Disclosure Bulletin, "Balanced Handling of I/O Interrupts in a Multiprocessor System", vol. 36 No. 02 Feb. 1993, pp. 165–166.*

IBM Technical Disclosure Bulletin, D. Giroir et al., "Interrupt Dispatching Method for Multiprocessing System", vol. 27 No. 4B Sep. 1984, pp. 2356–2359.*

* cited by examiner

Primary Examiner—Sumati Lefkowitz
(74) Attorney, Agent, or Firm—Leslie A. Van Leeuwen; Felsman, Bradley, Vaden, Gunter & Dillon, LLP

(57) ABSTRACT

Interrupts from an I/O subsystem are first directed to a single processor in a multiple superscalar processor data processing system. If an interrupt load on the processor is sufficiently high, the interrupt is sent (offloaded) to a second specific processor. The process continues throughout all superscalar processors in the data processing system and each processor builds interrupt prediction data corresponding to the interrupt load. A threshold counter may be added to the logic so offloading does not take place until a specified number of interrupts are queued within that specific processor, thus providing a fixed level of prediction data. Some processors may be left out of the offload string so they are not disturbed by an interrupt.

17 Claims, 5 Drawing Sheets

METHOD AND APPARATUS FOR INTERRUPT LOAD BALANCING FOR POWERPC PROCESSORS

BACKGROUND OF THE INVENTION

1. Technical Field

The present invention relates in general to data processing systems and in particular to data processing systems utilizing multiple superscalar processors. More particularly, the present invention relates to an interrupt source controller and assignment of interrupts to multiple superscalar processors utilized by the data processing system.

2. Description of the Related Art

An interrupt is an independent signal generated anywhere in a data processing system and is a notification to the processor of the occurrence of an event. External interrupts are usually generated by devices or sub-systems connected to the data processing system. In the case of external interrupts, a signal may be generated by striking a key on the keyboard, depressing a mouse button or a signal from the printer that the printer is active. The interrupt generally has no correlation with the execution of a program, because it originates outside the program. It may occur at any time during the execution of instructions, but is latched inside the processor to be addressed when the active instruction finishes execution. The occurrence of an interrupt is a significant event in the operation of a modern, high speed processor.

Much of the processor's ability to execute at maximum speed comes from the fact that the processor may predict what it will have to do next. This prediction capability is based on the processor's recent past operations. When an interrupt is taken by the processor, the operational context is changed and much of the data used to make operational predictions may become invalid. This may significantly slow down the processor.

Interrupts are usually maskable or non-maskable. Maskable interrupts may be suppressed by an interrupt flag that is placed in the status register referencing a particular interrupt or group of interrupts. However, non-maskable interrupts are typically priority interrupts that must be serviced immediately.

Data processing systems utilizing multiple superscalar processors have a significantly higher interrupt rate than prior art systems. Prior art interrupt source controllers distribute interrupts to the processors in a multiple processor system utilizing one of the following methods: randomly assign interrupts to one of the processors, assign the interrupt to one specific processor or notify all processors in the system.

Randomly assigning an interrupt to any one of the multiple processors provides a uniform probability of finding a processor without accumulated interrupt data. The lack of consistent and predictable interrupt data on all the processors restricts the efficiency of the random assignment method.

Assigning interrupts to one specific processor insures the best probability of that processor being able to accurately predict operations in the interrupt context. However, as the interrupt load increases, the single processor method may become a bottleneck in the system and load balancing becomes a problem.

Assigning the interrupt to all processors maximally disrupts the system. All processors are interrupted and it must be determined which processor will actually proceed to service the interrupt condition.

In reality, software in these systems mask off interrupts in most processors so that they effectively work as systems in which the interrupts are directed to only one processor with the associated load balance problems. As should thus be apparent, it would be desirable to provide a method that would allow an interrupt source controller in a multiple processor data processing system to service external interrupts promptly, provide a relatively predictable interrupt assignment scheme and improve interrupt load balancing.

SUMMARY OF THE INVENTION

It is therefore one object of the present invention to provide a method and system that will assign external interrupts to one of multiple superscalar processors, in a data processing system, in a relatively predictable manner.

It is another object of the present invention to provide a method and system that will assign multiple external interrupts to succeeding superscalar processors, in a multiple processor data processing system, as each processor reaches a pre-determined interrupt load.

It is a further object of the present invention to provide a method and system that will improve load balancing of the interrupts between processors.

It is yet another object of the present invention to provide a method and system that will direct interrupts to more than one processor.

It is a further object of the present invention to provide a method and system that will offload interrupts from a given processor as a limit is reached.

The foregoing objects are achieved as is now described.

Interrupts from an I/O subsystem are first directed to a first processor in a multiple superscalar processor data processing system. If an interrupt load on the processor is sufficiently high, the interrupt is sent (offloaded) to a second pre-determined processor. The process continues throughout all superscalar processors in the system and each processor builds interrupt prediction data corresponding to the interrupt load on the individual processor. A threshold counter may be added to the logic so offloading does not take place until a specified number of interrupts are queued within that specific processor, thus providing a pre-determined level of prediction data. Some processors may be left out of the offload string so they are not disturbed by an interrupt.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
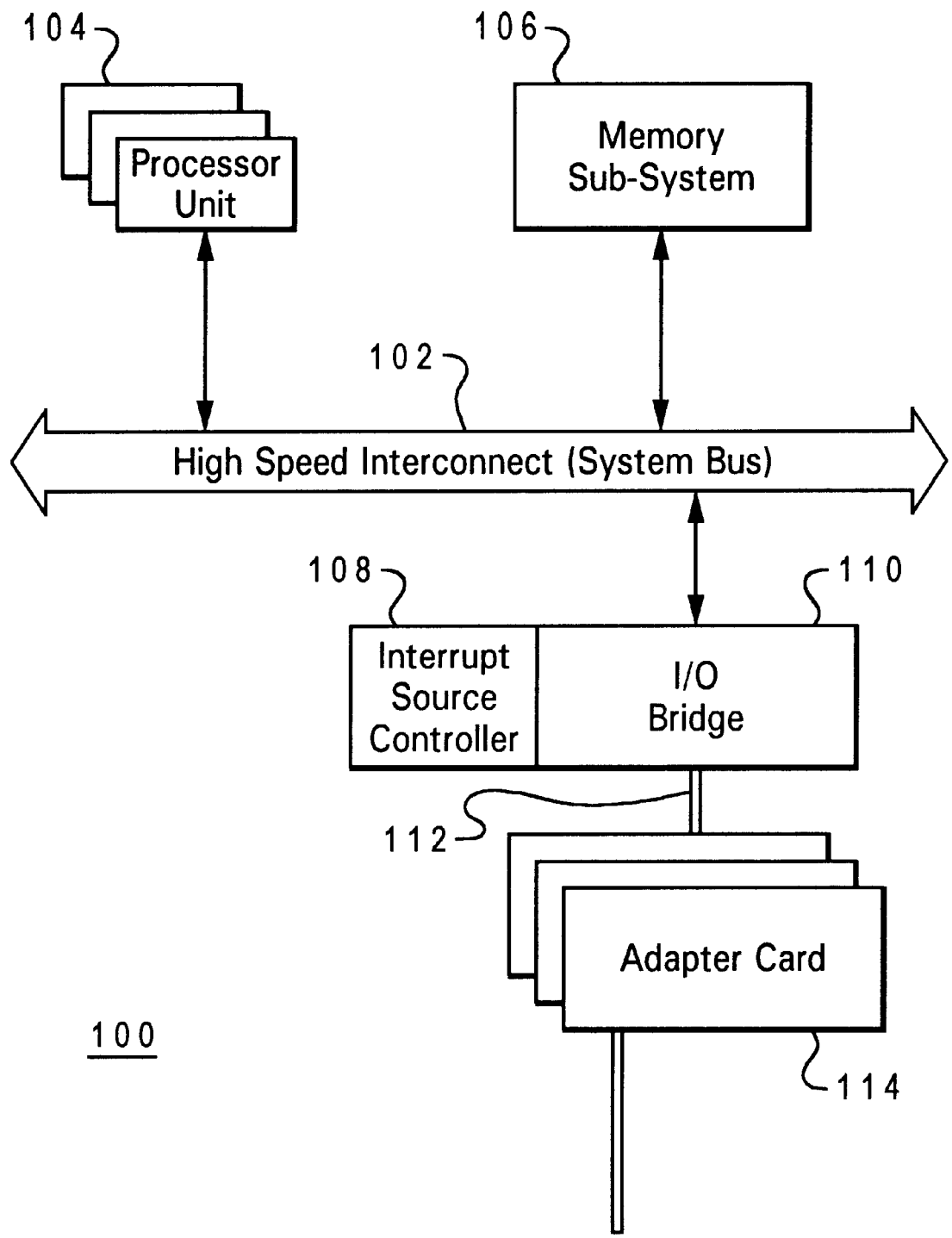
FIG. 1 depicts a high-level block diagram of a data processing system utilizing multiple superscalar processors, which may be utilized to implement the method and system of the present invention.

With reference now to the figures, and in particular with reference to FIG. 1, a high-level block diagram of a data processing system utilizing multiple superscalar processors, in which a preferred embodiment of the present invention may be implemented, is depicted. Data processing system 100 comprises a high speed interconnect ("System Bus") 102, interconnected with: one or more superscalar processing units ("processor") 104, one or more memory subsystems 106, one or more I/O bridges 110, each connected to one or more I/O buses 112, each bus being connected to one or more I/O adapters 114. Interrupt Source controller 108 is contained within I/O bridge 110. I/O bridge 110 translates I/O adapter requests into memory operations, processor load/store commands into I/O bus operations and I/O adapter signals into processor interrupts. As is known in the art, an interrupt is a signal generated in a data processing system and is a notification to the processor of the occurrence of an event. External interrupts are generated, for instance, by striking a key on a keyboard or depressing a mouse button and are usually transmitted to a processor via system buses.

Figure 2:
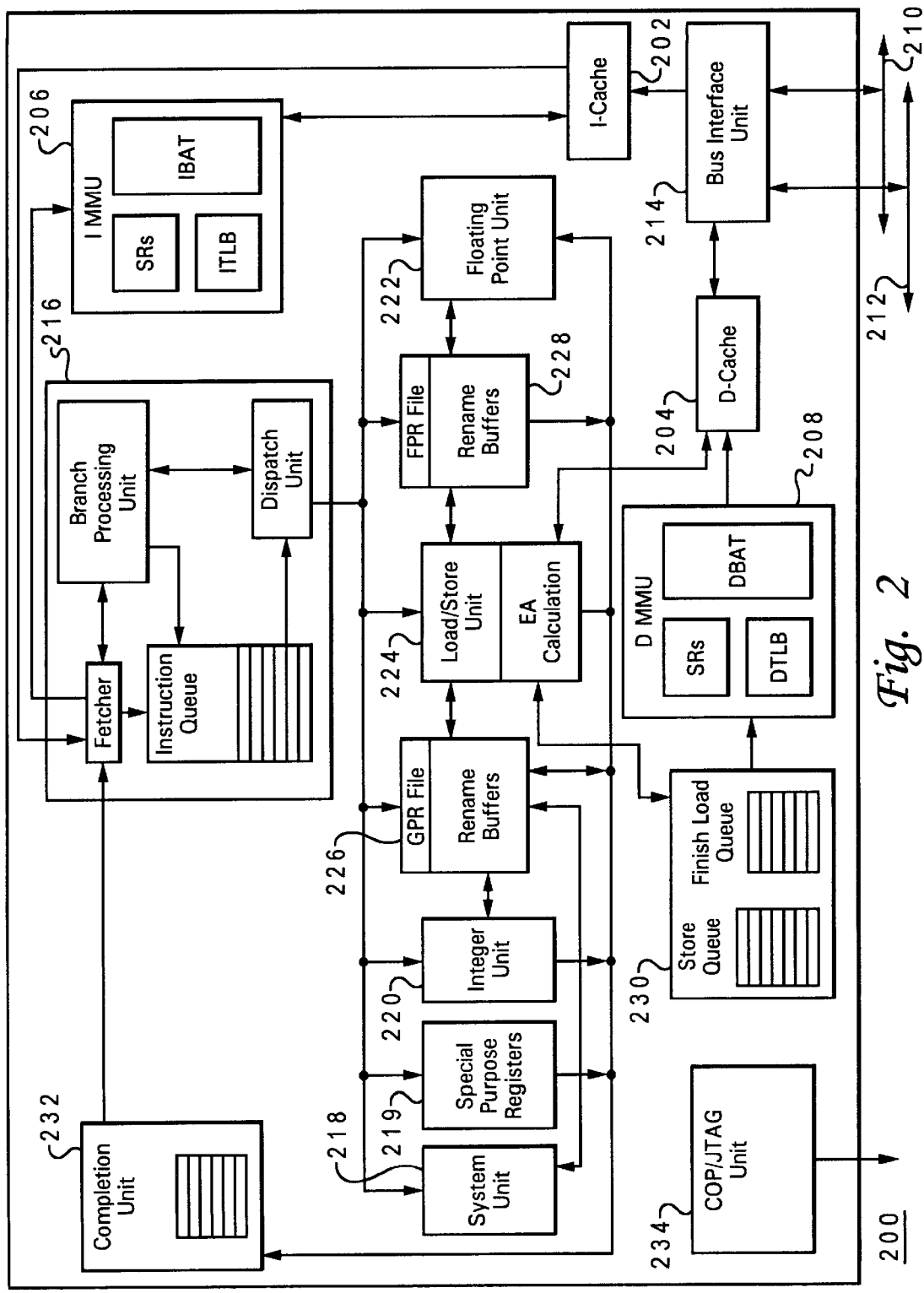
FIG. 2 is a block diagram of a processor and related portions of a data processing system in which a preferred embodiment of the present invention may be implemented.

Referring now to FIG. 2, a block diagram of a processor and related portions of a data processing system in which a preferred embodiment of the present invention may be implemented are illustrated. Processor 200 is a single integrated circuit superscalar microprocessor, such as the PowerPC™ processor available from IBM Corporation of Armonk, N.Y. Accordingly, processor 200 includes various units, registers, buffers, memories, and other sections, all of which are formed by integrated circuitry. Processor 200 also operates according to reduced instruction set computing ("RISC") techniques.

Processor 200 includes level one (L1) instruction and data caches ("I Cache" and "D Cache") 202 and 204, respectively, each having an associated memory management unit ("I MMU" and "D MMU") 206 and 208. As shown in FIG. 2, processor 200 is connected to system address bus 210 and to system data bus 212 via bus interface unit 214. Instructions are retrieved from system memory (not shown) to processor 200 through bus interface unit 214 and are stored in instruction cache 202, while data retrieved through bus interface unit 214 is stored in data cache 204. Instructions are fetched as needed from instruction cache 202 by instruction unit 216, which includes instruction fetch logic, instruction branch prediction logic, an instruction queue and a dispatch unit.

The dispatch unit within instruction unit 216 dispatches instructions as appropriate to executions units such as system unit 218, integer unit 220, floating point unit 222, or load/store unit 224. System unit 218 executes condition register logical, special register transfer, and other system instructions.

Special Purpose Registers 219 serve a variety of functions, such as providing controls, indicating status, configuring the processor and performing special operations. Integer or "fixed-point" unit 220 performs add, subtract, multiply, divide, shift or rotate operations on integers, retrieving operands from and storing results in integer or general purpose registers ("GPR File") 226. Floating point unit 222 performs single precision and/or double precision multiply/add operations, retrieving operands from and storing results in floating point registers ("FPR File") 228.

Load/store unit 224 loads instruction operands from data cache 204 into integer or floating point registers 226 or 228 as needed, and stores instructions results when available from integer or floating point registers 226 or 228 into data cache 204. Load and store queues 230 are utilized for these transfers from data cache 204 to and from integer or floating point registers 226 or 228. Completion unit 232, which includes reorder buffers, operates in conjunction with instruction unit 216 to support out-of order instruction processing, and also operates in connection with rename buffers within integer and floating point registers 226 and 228 to avoid conflict for a specific register for instruction results. Common on-chip processor ("COP") and joint test action group ("JTAG") unit 234 provides a serial interface to the system for performing boundary scan interconnect tests.

The architecture depicted in FIG. 2 is provided solely for the purpose of illustrating and explaining the present invention, and is not meant to imply any architectural limitations. Those skilled in the art will recognize that many variations are possible. Processor 200 may include, for example, multiple integer and floating point execution units to increase processing throughput. All such variations are within the spirit and scope of the present invention.

Figure 2A:
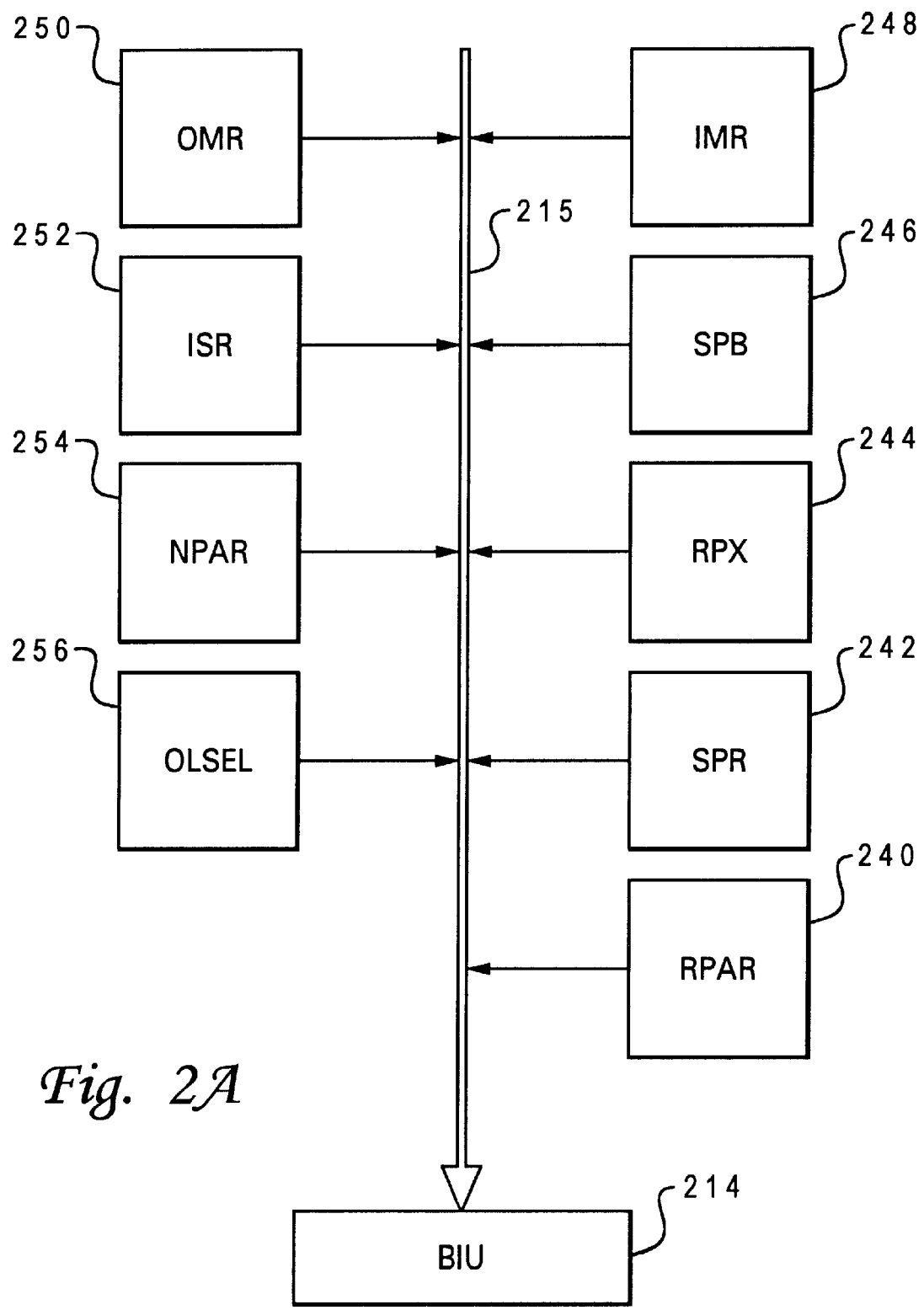
FIG. 2A depicts a high-level block diagram of Special Purpose Registers mapped in accordance with a preferred embodiment of the present invention.

Referring now to FIG. 2A, a high-level block diagram of Special Purpose Registers mapped in accordance with a preferred embodiment of the present invention, is illustrated. Each of the illustrated registers is mapped into one or more Special Purpose Registers ("SPR") 219 in processor 200. The mapping logic is added to the standard logic of processor 200, including its Bus Interface Unit 214. This additional logic allows external interrupts from either an interrupt source controller or by one of the system components.

System components external to processor 200 (i.e., I/O bridges, etc.) signal interrupts by writing an interrupt message to Signal Receive Port ("SRP") 242 in a given processor (not shown). The address of the given processor's SRP 242 is supplied to the processor's Bus Interface Unit ("BIU") 214 by the given processor's Receive Port Address Register ("RPAR") 240. This allows each processor in a multi-processor system to be separately addressed for the purpose of receiving interrupt messages.

Signal Receive Port 242, receives an interrupt message directed to processor 200 through bus interface unit 214 via bus 215. The address of the interrupt source received as part of the interrupt message is then placed into Signal Receive Port 242. Receive Port Expander ("RPX") 244 expands contents of SRP 242 to set a corresponding bit location in Signal Pending Buffer ("SPB") 246, where it is held for masking purposes.

SPB 246 contents are masked by contents of Interrupt Mask Register ("IMR") 248 to determine interrupt priority. Contents of Offload Mask Register ("OMR") 250 also mask SPB 246. Contents of these registers and the masking procedure combine and result in the determination of interrupts queued in this processor. The address of the highest priority queued interrupt is kept in the Interrupt Source Register 252. Next Processor Register ("NPAR") 254 specifies the processor next in line to receive an interrupt and Offload Selector ("OLSEL") 256 selects an interrupt to be forwarded to the SRP of the processor specified in NPAR 254.

Figure 3:
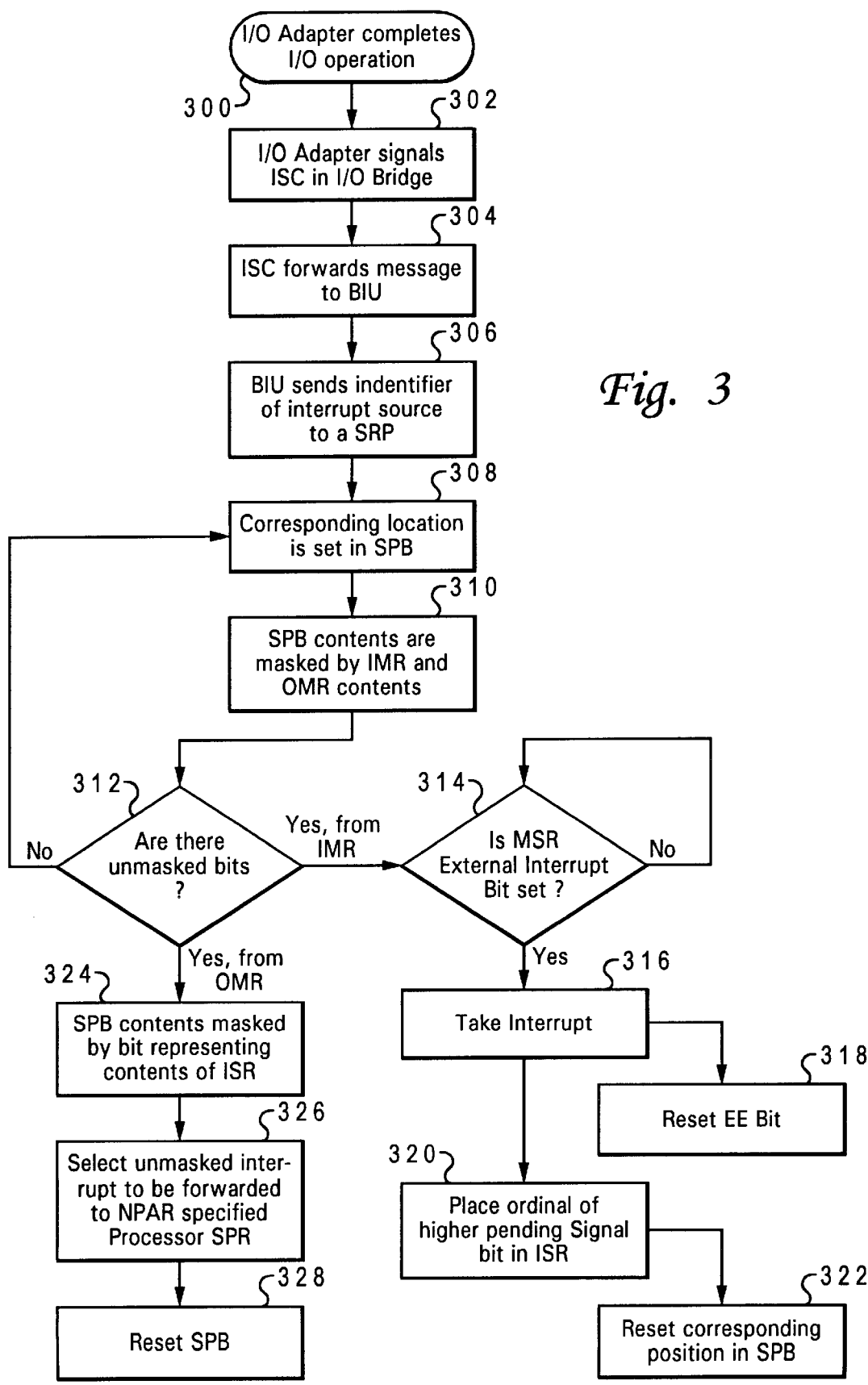
FIG. 3 illustrates a high-level flow chart of a method for reducing processing overhead for high frequency interrupts in a data processing system utilizing multiple superscalar processors, in accordance with a preferred embodiment of the present invention.

Referring to FIG. 3, a high-level flow chart of a method for reducing processing overhead for high frequency interrupts in a data processing system utilizing multiple superscalar processors, in accordance with a preferred embodiment of the present invention, is illustrated. The process begins with step 300, which depicts an I/O adapter completing an I/O operation. The process proceeds to step 302, which illustrates the I/O Adapter signaling Interrupt Source Controller in the I/O Bridge. The process proceeds next to step 304, which depicts the Interrupt Source Controller writing a message containing the interrupt source identifier of the I/O Adapter to the Bus Interface Unit of a processor (generally, a pre-determined processor in a multiple processor system) to signal an interrupt to the system processor. An external interrupt is permitted from either an interrupt source controller or by one of the system components (such as another Processor or adapter) writing a data value to an addressed location in the processor to be interrupted which is specified in a Receive Port Address Register ("RPAR").

The process proceeds to step 306, which illustrates the pre-determined processor's Bus Interface Unit ("BIU") responding to store operations directed to an address corresponding to the value contained in the Receive Port Address Register ("RPAR"), by sending a value corresponding to the identifier of the interrupt source into the Signal Receive Port ("SRP"). The process then passes to step 308, which depicts utilizing contents of the SRP to set the corresponding bit location in the Signal Pending Buffer.

The process proceeds next to step 310, which illustrates contents of an Interrupt Mask Register ("IMR") masking contents of the Signal Pending Buffer. Additionally, contents of the OMR are used to mask the contents of the SPB. The process then passes to step 312, which depicts a determination of whether there is a resulting unmasked bit. If there are no unmasked bits, the process returns to step 310 and repeats the steps of the process, waiting for the processor to change the IMR or OMR, or to receive a new interrupt as in step 300. If there is an unmasked bit, as a result of masking with contents of IMR, the process proceeds to step 314, which illustrates a determination of whether a Machine State Register External Interrupt Enable ("EE") bit is set. If it is not set, the process returns to step 314 and repeats until the processor is able to accept an interrupt. If, in step 314, the determination is made that a Machine State Register External Interrupt Enable bit is set, the process then proceeds to step 316, which depicts the processor receiving the interrupt. Subsequently, the process passes to step 318, which illustrates the External Interrupt Bit being reset.

After the processor receives the interrupt and resets the External Interrupt Enable bit, the process then proceeds to step 320, which depicts the ordinal of the higher order masked pending signal bit being placed in the Interrupt Source Register ("ISR"). Subsequently the process passes to step 322, which illustrates the act of loading the ISR, which causes the corresponding position to be reset in the Signal Pending Buffer.

Returning to step 310 and 312, concurrently with masking of Signal Pending Buffer by the contents of the Interrupt Mask Register, if there are unmasked bits from an Offload Mask Register, the process proceeds to step 324. Masking the SPB with the Offload Mask prevents the offloading of certain interrupt sources that for some reason must not be offloaded to another processor, i.e., if the service routine could only run on one processor, the interrupt would not be offloaded. Step 324 depicts the contents of the Signal Pending Buffer being masked by the Offload Mask Register and by the bit represented by the contents of the Interrupt Source Register. The result represents those interrupts queued in the specified processor that are available for offload to another processor. The process next proceeds to step 326, which illustrates an Offload Selector selecting an interrupt to be forwarded to the Signal Receive Port of a processor specified in a Next Processor Address Register. Step 326 may include a counting function such that interrupts are not offloaded until some pre-determined threshold is reached. This prevents temporary bursts of interrupts from unduly disturbing other processors while allowing offloads as the interrupt workload grows larger. The processor then continues to step 328, which depicts the offloaded interrupt being forwarded and the corresponding position in the Signal Pending Buffer being reset.

Figure 4:
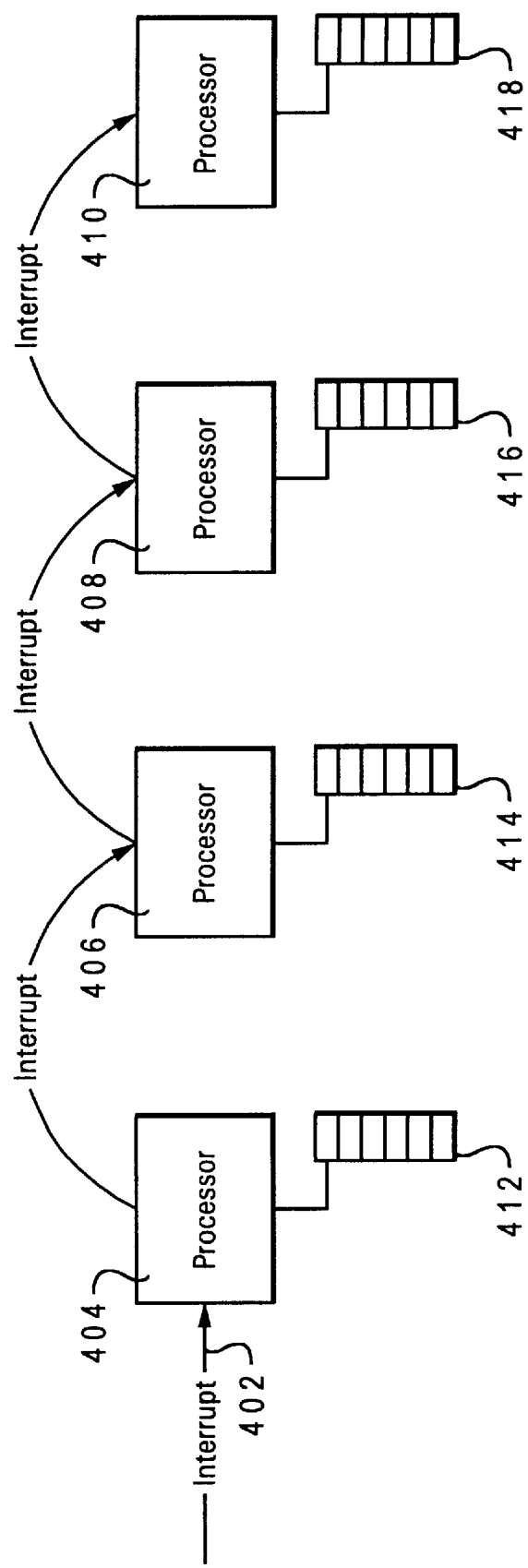
FIG. 4 depicts a high-level block diagram of multiple processors within a data processing system in which a preferred embodiment of the present invention may be implemented.

Referring now to FIG. 4, a high-level block diagram of a method for directing and offloading an interrupt to successive, designated processors in a data processing system. Multi-processor subsystem 400 of data processing system (not shown) comprises: multiple processors 404, 406, 408, and 410 in which interrupts are queued in processor queues 412, 414, 416 and 418 and, as is known in the art, there may be more or less processors contained within a multi-processor data processing system. Logic for offloading the interrupts to successive processors may contain a threshold counter for restricting the number of interrupts within each processor's queue. By pre-determining the number of interrupts in a processor's queue, prediction data is more accurate and improves efficiency of the processor.

Interrupt 402 is written to a first processor in a multi-processor system. Interrupt 402 is received in a Signal Receive Port (not shown) and if the interrupt queue for processor 404 has reached a pre-determined level, the interrupt is offloaded to processor 406. Depending on the pre-determined level for queue 414, the interrupt may be sent to processor 408, and so on, until the interrupt is entered into the interrupt queue of one of the processors in the system.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for servicing an interrupt message in a data processing system having a plurality of processors, comprising the steps of:

mapping special Purpose registers in each of said plurality of processors wherein said mapping logic provides, at least:

a receive port register for holding a unique address for said processor;

a signal pending buffer for holding a bit location;

at least two masking registers for said interrupt message;

a next processor register for designating a successive processor to receive an interrupt;

directing said interrupt message to a first processor;

masking said interrupt message to determine said interrupt message priority;

storing, in an interrupt source register, the address of the highest priority qeued said interrupt message;

utilizing the contents of said signal pending buffer and said at least two masking registers for determining the interrupts that are queued in said first processor;

utilizing an offload selector for offloading a specific (said interrupt message to a processor specified in said next processor register if said first processor is busy servicing another interrupt; and offloading said interrupt message from each successive busy processor to a different processor specified in said busy processor's next processor register until said interrupt message is accepted by one of said plurality of processors.

2. The method of claim 1, wherein said step of directing an interrupt signal to a first processor further comprises transmitting said interrupt message via an interrupt source controller to said processor; and storing the source address of said interrupt message on board said processor.

3. The method in claim 1, wherein said step of utilizing said offload selector for offloading a specific said interrupt message to a processor specified in said next processor register if said first processor is busy servicing another interrupt message, further comprises:

pre-determining a specific number of interrupts each processor will manage prior to offloading additional interrupts to a second processor.

4. The method in claim 1, further comprising storing interrupt prediction data in each processor.

5. The method in claim 1, further comprising the step of transmitting said interrupt signal directly from a data processing system component.

6. The method in claim 1, wherein said step of offloading said interrupt message from each successive busy processor to a different processor specified in said busy processor's next processor register until said interrupt message is accepted by one of said plurality of processors further comprises:

pre-designating a receiving order of said plurality of processors to which interrupt signals will be directed;

limiting a number of interrupt signals that each one of said plurality of processors will manage prior to offloading additional interrupts to a specified second processor, by including a threshold counter; and offloading said additional interrupts to each of said plurality of processors in said receiving order.

7. A data processing system having a plurality of processors, comprising:

logic within each processor for mapping special purpose registers wherein said mapped registers comprise, at least:

a receive report register for holding a unique address for said processor;

a signal pending buffer for holding a bit corresponding to an interrupt message address source;

at least two masking registers for masking said interrupt message to determine said interrupt message priority;

a next processor register for designating a next processor in line to receive an interrupt;

means for directing an interrupt message to a first processor;

an interrupt source register for storing the address of the highest priority queued said interrupt message;

an offload selector for offloading said interrupt message to another processor if said first processor is busy servicing another interrupt signal; and means for offloading said interrupt message from each said busy processor to a processor, specified in said busy processor's next processor register, within said data processing system until said interrupt signal is accepted by one of said plurality of processors.

8. The data processing system of claim 7, wherein said an offload selector for offloading said interrupt message to a second processor if said first processor is busy servicing another interrupt signal further comprises:

logic means for pre-designating a second processor for receiving an interrupt signal if said first processor is busy; and logic containing a threshhold counter for predetermining a specific number of interrupts for each processor to manage prior to offloading additional interrupts to said second processor.

9. The data processing system of claim 7, further comprising a mapped register onboard said processor for storing interrupt message prediction data.

10. The data processing system of claim 8, further comprising a means for receiving an external interrupt message directly from a data processing system component.

11. The data processing system of claim 7, wherein said means for offloading said interrupt message to each of said plurality of processors until said interrupt message is accepted by one of said processors further comprises:

means for pre-designating a receiving order of said plurality of processors that will receive interrupts;

a threshhold counter for limiting a number of interrupt messages that each one of said plurality of processors will manage prior to offloading additional interrupts to a specified second processor; and logic means for successively offloading said additional interrupts to each of said plurality of processors.

12. A computer-readable medium for servicing an interrupt message in a data processing system having a plurality of processors, comprising:

instructions within said computer-readable medium for mapping special purpose registers in each of said plurality of processors wherein said mapping logic provides, at least:

a receive port register for holding a unique address for said processor;

a signal pending buffer for holding a bit location:

at least two masking registers for said interrupt message;

a next Processor register for designating a successive processor to receive an interrupt;

instructions within said computer-readable medium for directing said interrupt message to a first processor;

instructions within said computer-readable medium for masking said interrupt message to determine said interrupt message priority;

instructions within said computer-readable medium for storing, in an interrupt source register, the address of the highest priority queued said interrupt message;

instructions within said computer-readable medium for utilizing the contents of said signal pending buffer and said at least two masking registers for determining the interrupts that are queued in said first processor;

instructions within said computer-readable medium for utilizing an offload selector for offloading a specific said interrupt message to a processor specified in said next processor register if said first processor is busy servicing another interrupt; and instructions within said computer-readable medium for offloading said interrupt message from each successive busy processor to a different processor within said data processing system until said interrupt message is accepted by one of said plurality of processors.

13. The computer-readable medium of claim 12, wherein said instructions for directing an interrupt message to a first processor further comprises instructions within said computer-readable medium for transmitting said interrupt message via an interrupt source controller to said processor; and instructions within said computer-readable medium for storing the source address of said interrupt message on board said first processor.

14. The computer-readable medium of claim 12, wherein said instructions for offloading said interrupt message if said first processor is busy servicing another interrupt message further comprises:

instructions within the computer-readable medium for predetermining a specific number of interrupts for each processor to manage prior to offloading additional interrupts to a second processor.

15. The computer-readable medium of claim 12, further comprising instructions within the computer-readable medium for storing interrupt prediction data in each processor.

16. The computer-readable medium of claim 12, further comprising instructions within the computer-readable medium for transmitting said interrupt message directly from a data processing system component.

17. The computer-readable medium of claim 12, wherein said instructions for offloading said interrupt message to each of said plurality of processors until said interrupt message is accepted by one of said processors further comprises:

instructions within the computer-readable medium for predesignating a receiving order of said plurality of processors that will receive interrupts;

instructions within the computer-readable medium for limiting a number of interrupt messages that each one of said plurality of processors will manage prior to offloading additional interrupts to a specified second processor, by including a threshold counter; and instructions within the computer-readable medium for successively offloading said additional interrupts to each of said plurality of processors.

\* \* \* \* \*